United States Patent [19]

Lalancette et al.

[11] Patent Number: 4,612,178
[45] Date of Patent: Sep. 16, 1986

[54] DEGRADATION OF POLYCYCLIC AROMATIC HYDROCARBONS ADSORBED OVER CHRYSOTILE ASBESTOS

[75] Inventors: Jean-Marc Lalancette; Hugues Menard, both of Sherbrooke, Canada

[73] Assignee: Ceram-Sna Inc., Quebec, Canada

[21] Appl. No.: 792,921

[22] Filed: Oct. 30, 1985

[51] Int. Cl.$^4$ .................. C01B 33/12; B01J 23/90; B01J 20/10

[52] U.S. Cl. ................... 423/338; 423/245; 423/437; 423/659; 502/38; 502/410

[58] Field of Search .............. 423/581, 210 C, 245 S, 423/338, 659, 581, 437; 502/38, 410; 210/908, 909

[56] References Cited

U.S. PATENT DOCUMENTS

| | | | |
|---|---|---|---|
| 3,274,123 | 9/1966 | Coyne | 502/410 |
| 4,131,543 | 12/1978 | Carosello | 210/909 |
| 4,437,999 | 3/1984 | Mayne | 252/626 |
| 4,517,094 | 5/1985 | Beall | 210/909 |

FOREIGN PATENT DOCUMENTS

| | | | |
|---|---|---|---|
| 3029877 | 10/1981 | Fed. Rep. of Germany | 502/410 |
| 812341 | 3/1981 | U.S.S.R. | 502/38 |

OTHER PUBLICATIONS

Menard, Hughes et al, Absorption Isotherms of Polycyclic Hydrocarbons on Asbestos Chrystolile by High Pressure Liquid Chromatography, Anal. Chem. 56, 1240 (1984).

Primary Examiner—Gary P. Straub

[57] ABSTRACT

The invention relates to a process for degrading polycyclic aromatic hydrocarbons adsorbed over chrysotile asbestos fibers which comprises oxidizing in the presence of moisture with ozone a mass of polycyclic aromatic hydrocarbons adsorbed on chrysotile asbestos fibers, whereby the hydrocarbons are degraded mainly to carbon dioxide and substantially pure chrysotile asbestos is recovered.

4 Claims, No Drawings

DEGRADATION OF POLYCYCLIC AROMATIC HYDROCARBONS ADSORBED OVER CHRYSOTILE ASBESTOS

SCOPE OF THE INVENTION

It is known that chrysotile asbestos can be a highly efficient adsorbent for toxic polycyclic aromatic hydrocarbons, such as benzo($\alpha$)-pyrene, fluorene, chrysene and the like, from the report of Hugues Ménard et al, Anal. Chem., 56, 1240 (1984).

Such a high adsorbency naturally leads to the use of chrysotile asbestos as an agent for the removal of toxic polycyclic aromatic hydrocarbons from the environment, said aromatic hydrocarbons being known as carcinogenic and toxic substances.

The adsorption of these toxic polycylic aromatic hydrocarbons over chrysotile asbestos, while providing a useful method of preventing pollution by hydrocarbons, generates an entity which might be in itself highly toxic. Furthermore, chrysotile asbestos when shaped as pellets for adsorption is expensive. Therefore, it has been found desirable to find a way of regenerating the asbestos by degradation of the adsorbed hydrocarbons in such a fashion as to be able to recycle said asbestos in a physical state that allows further use as adsorbent. Because of the potentially toxic nature of a mixture of asbestos and polycyclic aromatic hydrocarbons, it has also been found useful to develop a method where the handling of the chrysotile-hydrocarbon mixture is reduced to a minimum or eliminated altogether. Finally, since fumes or vapors of polyaromatic hydrocarbons are generally carried by gaseous effluents, it has been found useful to develop a closed loop system alternatively adsorbing polyaromatic hydrocarbons and regenerating chrysotile asbestos loaded with polyaromatic hydrocarbons.

Therefore, it would be highly desirable if a method could be provided whereby toxic polycyclic aromatic hydrocarbons adsorbed on chrysotile asbestos could be efficiently degraded into non-toxic components and that the chrysotile asbestos could itself be thus recycled for further use as an adsorbent for toxic polycyclic hydrocarbons.

SUMMARY OF THE INVENTION

It has been found that toxic polycyclic aromatic hydrocarbons adsorbed over chrysotile asbestos can be oxidized in an essentially quantitative fashion by ozone, the chrysotile asbestos fibers used as adsorbent acting unexpectedly as a promotor for said oxidation, particularly in the presence of moisture.

It has further been found that the thus treated chrysotile asbestos possesses enhanced capacity for adsorbing further quantities of toxic polycyclic aromatic hydrocarbons.

DESCRIPTION OF THE INVENTION

The disposal of polycyclic aromatic hydrocarbon adsorbed over chrysotile asbestos fibers is potentially a problem since both types of material involved are rated as harmful and severely regulated by agencies responsible for the protection of the environment.

It has been found that dry chrysotile asbestos is a highly efficient adsorbent of polycyclic aromatic hydrocarbons such as benzo($\alpha$)-pyrene, fluorene and the like which are usually discharged by industrial combustion engine, arc furnace and the like.

Obviously adsorbing polycyclic hydrocarbons on chrysotile asbestos, though appearing to solve an environment problem by preventing the pollution of air with said polycyclic hydrocarbons, create a further problem in the disposal of highly concentrated pollutants which are known to be carcinogenic and toxic substances.

Under such circumstances, it will be readily understood that although the potential of chrysotile asbestos fibers is great as an agent for the removal of polyaromatic hydrocarbons from the environment, the handling of the resulting chrysotile saturated with hydrocarbon must receive extreme attention if one does not want to go from bad to worse, because of the synergism involved between polycyclic aromatic hydrocarbons and chrysotile asbestos.

Several methods can be used to dispose of the chrysotile asbestos saturated with polyaromatic hydrocarbons. For example, the hydrocarbon can be burned at high temperature. Or the saturated chrysotile can be buried in sanitary landfills. In either instances, the handling will call for substantial arrangements to avoid dust emission or exposure of the operators to this potentially very aggressive mixture.

In fact, it was found highly desirable to have a system where, in the same setup used for the adsorption of polyaromatic hydrocarbons, the destruction of the adsorbed hydrocarbon could be achieved with a possibility of reuse of the recycled chrysotile. Such an arrangement would prevent or at least minimize handling problems that would be otherwise a substantial limiting factor in the use of chrysotile asbestos as adsorbent of polycyclic hydrocarbons.

In order to achieve this destruction "in situ", without degrading the chrysotile asbestos, high temperature must be avoided, thus precluding mere combustion. It is known that ozone can attack polycyclic hydrocarbon, since these hydrocarbons are characterized by a structure incorporating conjugated double bonds. It appeared obvious that ozone would therefore be the ideal reagent for the low temperature degradation of polycyclic aromatic hydrocarbons. In the course of the evaluation of the performances of ozone, it was noted however that the solid substrate, that is the chrysotile asbestos, was showing a significant improvement over the effect of other fibrous or non fibrous substrates for the adsorption of polycyclic aromatic hydrocarbons, such as Celite ® or glass wool. This effect was enhanced in the presence of moisture. Therefore, it became quite clear that chrysotile asbestos, beside its remarkable properties as an adsorbent for the polycyclic aromatic hydrocarbon, unexpectedly is also a promotor of their oxidation by ozone when they are adsorbed over said chrysotile asbestos.

This situation sets a pattern where a closed loop can be established, in a first state, chrysotile asbestos being used in an appropriate shape or setup as an adsorbent for hydrocarbon and in the same mechanical configuration, treated in a second stage with ozone, in order to regenerate its surface. It will be readily understood by those familiar with the handling of gaseous substances that an alternate exposure of the adsorbent to a stream loaded with polyaromatic hydrocarbons and ozone presents no particular problem.

EXAMPLES

The following examples illustrate the main points of the invention.

Example 1

Effect of the substrate upon which the polycyclic hydrocarbons is adsorbed on ozone oxidation

A given weight of hydrocarbon was adsorbed over a weighted sample of adsorbent and the material placed in a column 1 cm×10 cm, a slow stream (100 cc/min) of air containing 3% of ozone being circulated at room temperature through the column. The exit gases were analyzed with barium for $CO_2$. The mass balance was established by extraction of residues on the column. The observed results were the following, after 180 minutes of reaction.

| Type of support | Weight of support (g) | Nature of hydro-carbon | Weight of hydro-carbon (g) | % of reacted hydro-carbon | % of reacted product as $CO_2$ |
|---|---|---|---|---|---|
| Chryso-tile as-bestos (BC4T) | 10.0 | Pyrene | 0.0743 | 57.6 | 49.0 |
| Glass-wool | 7.8 | Pyrene | 0.0743 | 33.5 | 13.6 |
| Celite | 10.0 | Pyrene | 0.0743 | 49.6 | 20.2 |

It will be readily noted that the amount of reacted product is at its maximum with chrysotile asbestos. Beside that, the amount of degradation all the way to $CO_2$ is much more substantial when asbestos is used as support.

Example 2

Effect of moist ozone on oxidation of adsorbed hydrocarbons

The experimental technique is similar in Example #1 except that 5 ml of water was added to the column. The results are the following, all experiment being done on chrysotile asbestos (BC4T, 10 g) containing 0.0743 g of pyrene.

| Moisture condition | % of reacted hydrocarbon | % of reacted hydro-carbon as $CO_2$ |
|---|---|---|
| Dry | 57.6 | 49.0 |
| 5gH$_2$O on column | 86.3 | 97.3 |

This comparison is quite convincing as to the beneficial effect of the presence of water on the completeness of the degradation of the hydrocarbon by ozone.

Example 3

Degradation by ozone of various polycyclic aromatic hydrocarbons adsorbed on chrysotile asbestos.

The experimental procedure is similar to example #1, the hydrocarbon being adsorbed over 10.0 g of chrysotile asbestos (BC4T).

| Nature of hydrocarbon | Weight of hydrocarbon (g) | % of reacted hydrocarbon | % of reacted product as $CO_2$ |
|---|---|---|---|
| Benzo pyrene: | 0.0259 | 87.1 | 99.4 |
| Benzo perylene | 0.0847 | 95.0 | 100 |
| Naphtalene | 0.0767 | 95.9 | 85.7 |
| Fluorene | 0.0764 | 94.8 | 29.5 |
| Phenanthrene: | 0.0528 | 84.4 | 56.2 |

From this example it can be noted that the reaction is quite general with polycyclic aromatic molecules adsorbed on chrysotile asbestos.

Example 4

In another experiment a flow rate of 340 to 360 ml/min. $O_2$ was used, the ozone content being 144.3 mg $O_3$/l corresponding to 6.7% $O_3$ by volume or 10.1% by weight. This gas stream was circulated through a 20 g sample of asbestos (BC4T) holding benzo-perylene (0.085 g) in a cylindrical reactor having a diameter of 1 cm and a length of 20 cm. The temperature of the reactor was 25° C. Using the described method of analysis it was found that 95% of the hydrocarbon was degraded essentially to $CO_2$ after treatment of the system for one hour.

Example 5

A sample of recycled BC4T asbestos (1.00 g) recovered from adsorption of benzoαpyrene was placed in a cylindrical reactor having a diameter of 4.5 mm and a length of 40 mm and was then treated with ozone at 20° C. (1 liter per hour at 6% $O_3$ by volume for one hour: a large excess). Then, the adsorption of anthracene was determined by H.P.L.C. according to the method of Ménart et al (Analytical) Chemistry 56, 1240 (1984). These measurements were compared by similar adsorption made on an identical column where fresh asbestos (BC4T) had not been treated with ozone. It was noted that the ozone-treated asbestos was showing a retention capacity of anthracene that had increased by factor of 3. Therefore, it can be concluded that the ozone treatment improves rather than decreases the ability of asbestos to adsorb polyaromatic hydrocarbons.

What is claimed is:

1. A process for degrading polycyclic aromatic hydrocarbons adsorbed over chrysotile asbestos fibers which comprises oxidizing at low temperature in the presence of moisture with ozone a mass of polycyclic aromatic hydrocarbons adsorbed on chrysotile asbestos fibers, while the hydrocarbons are degraded mainly to carbon dioxide and the resulting chrysotile asbestos is recovered.

2. The process of claim 1 wherein the oxidizing is conducted at a temperature of 20° to 25° C.

3. A method for enhancing the adsorption capacity of chrysotile asbestos for toxic polyaromatic hydrocarbons which comprises oxidizing at low temperature in the presence of moisture a mass of chrysotile asbestos adsorbed with toxic polyaromatic hydrocarbons with ozone while the toxic polyaromatic hydrocarbons are degraded mainly to carbon dioxide and recovering the resulting chrysotile asbestos, said chrysotile asbestos being characterized by an enhanced capacity to adsorb further quantities of toxic polyaromatic hydrocarbons as compared to asbestos which has not been contacted with ozone.

4. The method of claim 2 wherein the oxidizing is conducted at 20° to 25° C.

* * * * *